(12) United States Patent
Fulayter

(10) Patent No.: US 10,253,784 B2
(45) Date of Patent: Apr. 9, 2019

(54) MULTI-STAGE CO-ROTATING VARIABLE PITCH FAN

(71) Applicant: Rolls-Royce Corporation, Indianapolis, IN (US)

(72) Inventor: Roy D. Fulayter, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 489 days.

(21) Appl. No.: 15/065,247

(22) Filed: Mar. 9, 2016

(65) Prior Publication Data

US 2016/0265547 A1 Sep. 15, 2016

Related U.S. Application Data

(60) Provisional application No. 62/132,148, filed on Mar. 12, 2015.

(51) Int. Cl.

| F01D 7/00 | (2006.01) |
|---|---|
| F04D 29/36 | (2006.01) |
| B64C 11/32 | (2006.01) |
| F02K 1/66 | (2006.01) |
| F04D 19/02 | (2006.01) |
| F04D 29/32 | (2006.01) |

(52) U.S. Cl.
CPC .......... *F04D 29/362* (2013.01); *B64C 11/325* (2013.01); *F01D 7/00* (2013.01); *F02K 1/66* (2013.01); *F04D 19/02* (2013.01); *F04D 29/323* (2013.01); *F04D 29/325* (2013.01); *F05D 2220/36* (2013.01); *F05D 2260/4031* (2013.01); *F05D 2260/53* (2013.01); *F05D 2260/74* (2013.01); *F05D 2260/79* (2013.01)

(58) Field of Classification Search
CPC .... F04D 29/362; F04D 29/323; F04D 29/325; F02K 1/66; B64C 11/325; F01D 7/00; F01D 1/30
See application file for complete search history.

(56) References Cited

U.S. PATENT DOCUMENTS

| 3,489,338 | A | * | 1/1970 | Davies .............. F01D 7/00 416/157 R |
|---|---|---|---|---|
| 3,946,554 | A | | 3/1976 | Neumann |
| 4,657,484 | A | | 4/1987 | Wakeman et al. |
| 4,664,599 | A | | 5/1987 | Robbins et al. |
| 4,751,816 | A | | 6/1988 | Perry |
| 4,860,537 | A | | 8/1989 | Taylor et al. |
| 4,936,748 | A | | 6/1990 | Adamson et al. |

(Continued)

FOREIGN PATENT DOCUMENTS

CH 244980 A 10/1946

OTHER PUBLICATIONS

Extended European Search Report, European Application No. 16159059.1-1607, dated Aug. 8, 2016, 7 pages.

(Continued)

*Primary Examiner* — Justin Seabe
*Assistant Examiner* — Sabbir Hasan
(74) *Attorney, Agent, or Firm* — Barnes & Thornburg LLP

(57) ABSTRACT

A fan for a gas turbine engine is disclosed. The fan includes a fan disk and a plurality of fan blades coupled to the fan disk. The fan disk is adapted for rotation about a central axis. The fan blades are coupled to the fan disk for rotation therewith about the central axis.

15 Claims, 3 Drawing Sheets

(56) References Cited

U.S. PATENT DOCUMENTS

| | | | |
|---|---|---|---|
| 4,976,102 A | 12/1990 | Taylor | |
| 5,274,999 A * | 1/1994 | Rohra | F02C 3/067 60/226.1 |
| 6,339,927 B1 | 1/2002 | DiPietro, Jr. | |
| 2009/0145102 A1 | 6/2009 | Roberge et al. | |
| 2016/0025003 A1 * | 1/2016 | Schwarz | F01D 25/16 415/69 |

OTHER PUBLICATIONS

Glaser, Fredrick; Woodward, Richard P. and Lucas, James G., Acoustic and Aerodynamic Performance of a Variable-Pitch 1.83 Meter (6FT) Diameter 1.20 Pressure-Ratio Fan Stage (QF-9), Feb. 1977, 69 pages.

Moore, Royce D. and Osborn, Walter M., Aerodynamic Performance of 1.38 Pressure Ratio Variable Pitch Fan Stage, Sep. 1979, 72 pages.

* cited by examiner

MULTI-STAGE CO-ROTATING VARIABLE PITCH FAN

CROSS REFERENCE TO RELATED APPLICATIONS

This application claims priority to and the benefit of U.S. Provisional Patent Application No. 62/132,148, filed 12 Mar. 2015, the disclosure of which is now expressly incorporated herein by reference.

FIELD OF THE DISCLOSURE

The present disclosure relates generally to gas turbine engines, and more specifically to fans used in gas turbine engines.

BACKGROUND

Gas turbine engines used to power aircraft often include a fan that is driven by an engine core to provide thrust for moving the aircraft. Such fans typically include a fan disk mounted to the engine core and a plurality of fan blades mounted to the fan disk for rotation with the fan disk to push air aftward and produce forward thrust.

In certain situations, it is desirable to push air forward rather than aftward to produce reverse thrust. During landing, for example, reverse thrust causes the aircraft to decelerate, thereby reducing wear on the brakes of the aircraft and enabling the aircraft to stop over shorter landing distances. In some applications, reverse thrust is produced using a thrust reversal device that is adapted to redirect air pushed aftward by the fan forward. Due to the size of many thrust reversal devices, incorporating the thrust reversal devices into gas turbine engines presents challenges. As such, alternative approaches for producing reverse thrust are desirable.

SUMMARY

The present disclosure may comprise one or more of the following features and combinations thereof.

According to one aspect of the present disclosure, a fan for a gas turbine engine may comprise a fan disk and a plurality of fan blades. The fan disk may be adapted for rotation about a central axis. The plurality of fan blades may be coupled to the fan disk for rotation therewith about the central axis. The plurality of fan blades may include first-stage fan blades and second-stage fan blades spaced axially aft of the first-stage fan blades along the central axis. The first-stage and second-stage fan blades may be coupled to the fan disk for movement relative to the fan disk from forward pitch angles associated with air directed aftward along the central axis to reverse pitch angles associated with air directed forward along the central axis. Each of the first-stage and second-stage fan blades may have a solidity of less than 1.0.

In some embodiments, the first-stage and second-stage fan blades may be coupled together for movement relative to the fan disk from the forward pitch angles to the reverse pitch angles at substantially the same time. The fan may further comprise an idler gear coupled between the first-stage and second-stage fan blades. The idler gear may couple the first-stage and second-stage fan blades to cause movement of the first-stage and second-stage fan blades relative to the fan disk at substantially the same time.

In some embodiments, the first-stage and second-stage fan blades may be coupled to the fan disk for movement relative to the fan disk from the forward pitch angles to the reverse pitch angles in a counterclockwise direction. The fan may have a hub-to-tip ratio within the range of about 0.20 to 0.28.

In some embodiments, the plurality of fan blades may include third-stage fan blades spaced axially aft of the second-stage fan blades along the central axis and fourth-stage fan blades spaced axially aft of the third-stage fan blades along the central axis. The third-stage and fourth-stage fan blades may be coupled to the fan disk for movement relative to the fan disk from forward pitch angles associated with air directed aftward along the central axis to reverse pitch angles associated with air directed forward along the central axis. Each of the third-stage and fourth-stage fan blades may have a solidity of less than 1.0. The third-stage and fourth-stage fan blades may be coupled together for movement relative to the fan disk from the forward pitch angles to the reverse pitch angles at substantially the same time. The fan may further comprise an idler gear coupled between the third-stage and fourth-stage fan blades. The idler gear may couple the third-stage and fourth-stage fan blades to cause movement of the third-stage and fourth-stage fan blades relative to the fan disk at substantially the same time. Additionally, in some embodiments, the first-stage, second-stage, third-stage, and fourth-stage fan blades may be coupled to the fan disk for movement relative to the fan disk from the forward pitch angles to the reverse pitch angles in a counterclockwise direction. The fan may have a hub-to-tip ratio within the range of about 0.20 to 0.28.

In some embodiments, circumferentially adjacent blades of the first-stage fan blades may be movable past one another in a spaced-apart relationship with one another when the first-stage fan blades are moved relative to the fan disk from the forward pitch angles to the reverse pitch angles. Circumferentially adjacent blades of the second-stage fan blades may be movable past one another in a spaced-apart relationship with one another when the second-stage fan blades are moved relative to the fan disk from the forward pitch angles to the reverse pitch angles. The plurality of fan blades may include third-stage fan blades spaced axially aft of the second-stage fan blades along the central axis and fourth-stage fan blades spaced axially aft of the third-stage fan blades along the central axis. The third-stage and fourth-stage fan blades may be coupled to the fan disk for movement relative to the fan disk from forward pitch angles associated with air directed aftward along the central axis to reverse pitch angles associated with air directed forward along the central axis. Circumferentially adjacent blades of the third-stage fan blades may be movable past one another in a spaced-apart relationship with one another when the third-stage fan blades are moved relative to the fan disk from the forward pitch angles to the reverse pitch angles. Circumferentially adjacent blades of the fourth-stage fan blades may be movable past one another in a spaced-apart relationship with one another when the fourth-stage fan blades are moved relative to the fan disk from the forward pitch angles to the reverse pitch angles.

According to another aspect of the present disclosure, a fan for a gas turbine engine may comprise a fan disk and a plurality of fan blades. The fan disk may be adapted for rotation about a central axis. The plurality of fan blades may be coupled to the fan disk for rotation therewith about the central axis. The plurality of fan blades may include first-stage fan blades and second-stage fan blades spaced axially aft of the first-stage fan blades along the central axis. The first-stage and second-stage fan blades may be coupled to the fan disk for movement relative to the fan disk from forward pitch angles associated with air directed aftward along the central axis through flat pitch angles associated with a lack of air being directed aftward along the central axis to reverse pitch angles associated with air directed forward along the central axis.

In some embodiments, the fan may further comprise an idler gear coupled between the first-stage and second-stage fan blades. The idler gear may couple the first-stage and second-stage fan blades to cause movement of the first-stage and second-stage fan blades relative to the fan disk from the forward pitch angles through the flat pitch angles to the reverse pitch angles at substantially the same time. Circumferentially adjacent blades of the first-stage fan blades may be in a spaced-apart relationship with one another when the first-stage fan blades move through the flat pitch angles, and circumferentially adjacent blades of the second-stage fan blades may be in a spaced-apart relationship with one another when the second-stage fan blades move through the flat pitch angles. The plurality of fan blades may include third-stage fan blades spaced axially aft of the second-stage fan blades along the central axis and fourth-stage fan blades spaced axially aft of the third-stage fan blades along the central axis. The third-stage and fourth-stage fan blades may be coupled to the fan disk for movement relative to the fan disk from forward pitch angles associated with air directed aftward along the central axis through flat pitch angles associated with a lack of air being directed aftward along the central axis to reverse pitch angles associated with air directed forward along the central axis. Circumferentially adjacent blades of the third-stage fan blades may be in a spaced-apart relationship with one another when the third-stage fan blades move through the flat pitch angles. Circumferentially adjacent blades of the fourth-stage fan blades may be in a spaced-apart relationship with one another when the fourth-stage fan blades move through the flat pitch angles.

According to yet another aspect of the present disclosure, a method of operating an aircraft may comprise operating a fan included in a gas turbine engine of the aircraft so that a plurality of fan blades of the fan have forward pitch angles associated with air directed aftward along a central axis of the gas turbine engine. The method may further comprise moving the plurality of fan blades relative to a fan disk of the fan from the forward pitch angles through flat pitch angles associated with a lack of air being directed aftward along the central axis toward reverse pitch angles associated with air directed forward along the central axis.

In some embodiments, the plurality of fan blades may have a solidity of less than 1.0. The plurality of fan blades may comprise at least two stages of fan blades axially spaced from one another along the central axis. Moving the plurality of fan blades from the forward pitch angles through the flat pitch angles toward the reverse pitch angles may comprise moving the at least two stages of fan blades from the forward pitch angles through the flat pitch angles toward the reverse pitch angles so that circumferentially adjacent blades of each stage of the at least two stages of fan blades are in a spaced-apart relationship with one another when the at least two stages of fan blades move through the flat pitch angles. Moving the plurality of fan blades from the forward pitch angles through the flat pitch angles toward the reverse pitch angles may comprise moving the at least two stages of fan blades from the forward pitch angles through the flat pitch angles toward the reverse pitch angles at substantially the same time.

These and other features of the present disclosure will become more apparent from the following description of the illustrative embodiments.

DETAILED DESCRIPTION OF THE DRAWINGS

Figure 1:
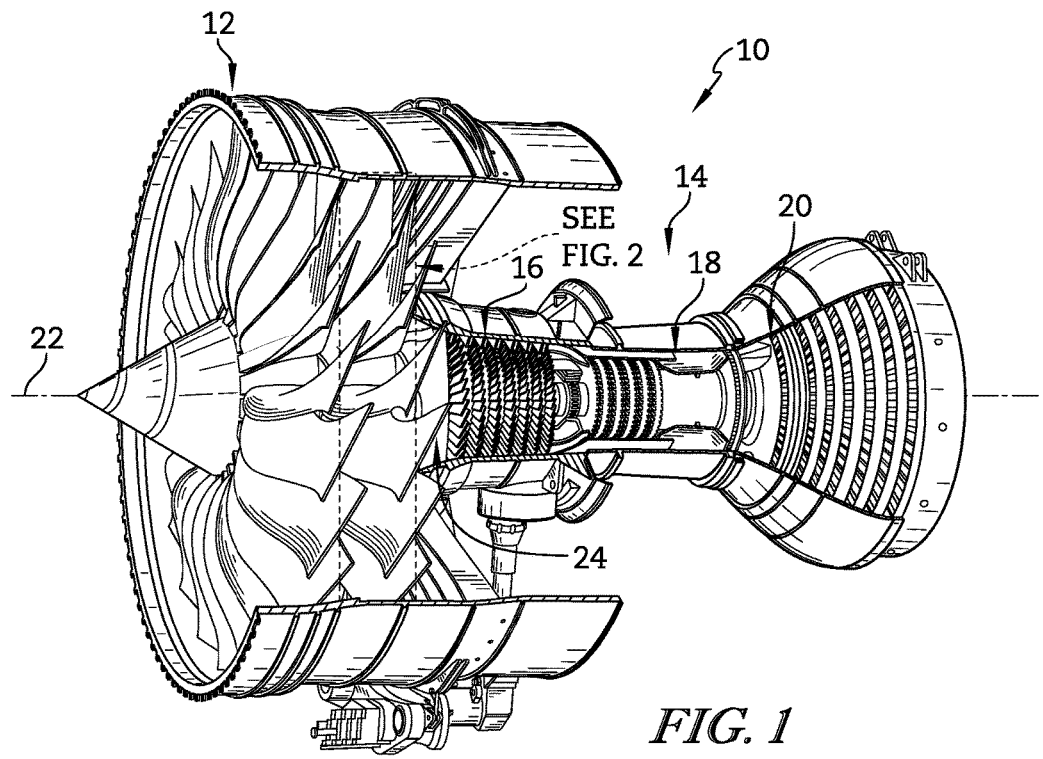
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

Referring now to FIG. 1, an illustrative aerospace gas turbine engine 10 is cut-away to show that the engine 10 includes a fan 12 and an engine core 14 adapted to drive the fan 12. The fan 12 and the engine core 14 are adapted to push air to propel an aircraft. The engine core 14 includes a compressor 16, a combustor 18, and a turbine 20. The compressor 16 compresses and delivers air to the combustor 18. The combustor 18 mixes the compressed air with fuel, ignites the air/fuel mixture, and delivers the combustion products (i.e., hot, high-pressure gases) to the turbine 20. The turbine 20 converts the combustion products to mechanical energy (i.e., rotational power) that drives the compressor 16 and the fan 12. The fan 12, the compressor 16, the combustor 18, and the turbine 20 are illustratively arranged along a central axis 22 of the gas turbine engine 10.

The engine 10 further illustratively includes a transmission 24 that is arranged along the central axis 22 as shown in FIG. 1. The transmission 24 is coupled to the turbine 20 and the fan 12. The transmission 24 is configured to transmit rotational power generated by the turbine 20 about the axis 22 to the fan 12. As a result, the fan 12 is driven by the turbine 20 through the transmission 24 to rotate at a fan speed offset from a turbine speed of the turbine 20. In the illustrative embodiment, the fan speed of the fan 12 is illustratively less than the turbine speed of the turbine 20.

Figure 2:
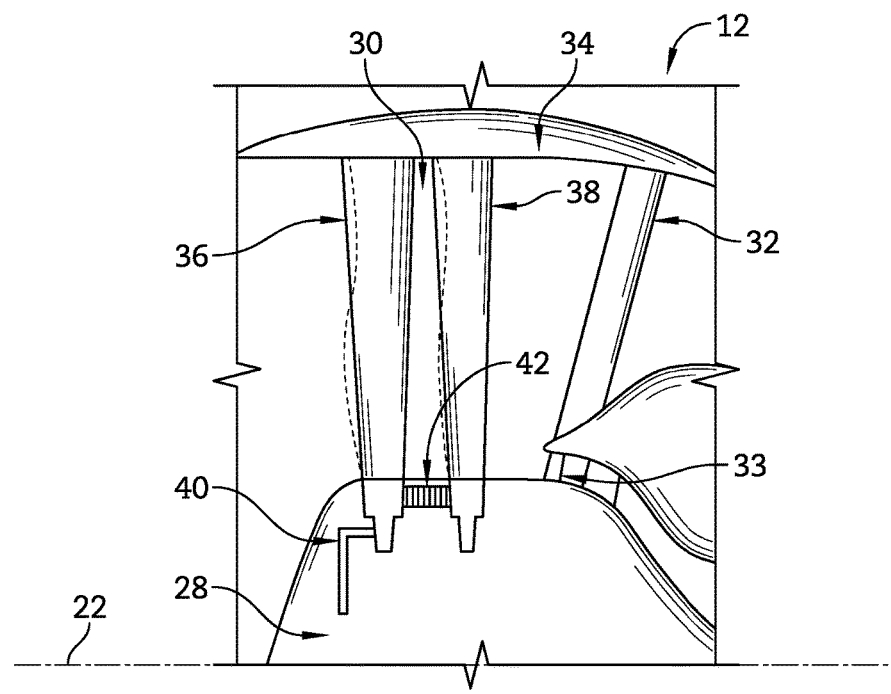
FIG. 2 is a diagrammatic view of a portion of a fan included in the gas turbine engine of FIG. 1.

Referring now to FIG. 2, the fan 12 illustratively includes a fan disk 28, fan blades 30, and guide vanes 32, 33 spaced axially aft of the fan blades 30 along the axis 22. The fan disk 28 is adapted for rotation about the central axis 22. The fan blades 30 are coupled to the fan disk 28 for common rotation with the fan disk 28 about the axis 22. The guide vanes 32, 33 are coupled to a stationary case 34 that extends around the fan blades 30 and are therefore constrained against rotation about the axis 22.

The fan blades 30 illustratively include first-stage fan blades 36 and and second-stage fan blades 38 spaced axially aft of the first-stage fan blades 36 along the axis 22 as shown in FIG. 2. The fan blades 36, 38 are spaced from one another along the axis 22 without a stationary component positioned between the blades 36, 38 along the axis 22. In the illustrative embodiment, the fan blades 36, 38 have a relatively straight leading edge, but in other embodiments, the blades 36, 38 may have a curved (forward swept) profile as suggested in phantom. Additionally, in other embodiments still, the blades 36, 38 may have a backward swept profile rather than a forward swept profile.

Figure 3:
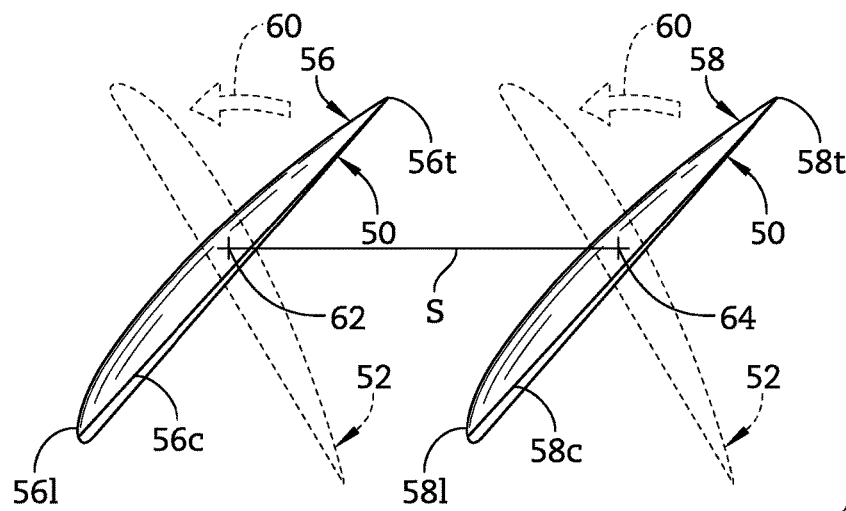
FIGS. 3-5 are diagrammatic views of a pair of fan blades included in the fan of FIG. 2 moving from forward pitch angles through flat pitch angles to reverse pitch angles.
Figure 5:
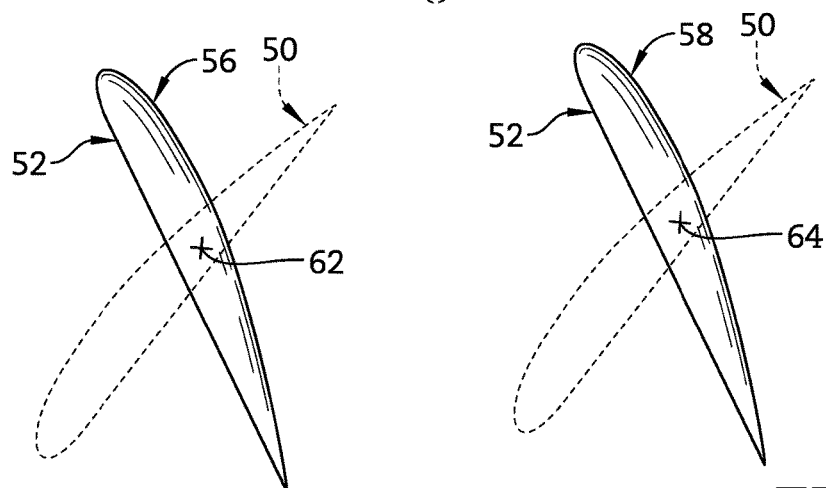

The first and second-stage fan blades 36, 38 are coupled to the fan disk 28 for movement relative to the fan disk 28 from forward pitch angles 50 to reverse pitch angles 52 (best seen in FIGS. 3 and 5). The forward pitch angles 50 are associated with air directed aftward by the blades 30 along the axis 22, whereas the reverse pitch angles 52 are associated with air directed forward by the blades 30 along the axis 22. The forward pitch angles 50 and the reverse pitch angles 52 are therefore associated with forward and reverse thrust, respectively. In the illustrative embodiment, each of the first and second-stage fan blades 36, 38 have a solidity of less than 1.0.

The fan 12 further illustratively includes a pitch adjustment mechanism 40 as shown in FIG. 2. The pitch adjustment mechanism 40 is adapted to move either the first-stage fan blades 36 or the second-stage fan blades 38 relative to the fan disk 28 from the forward pitch angles 50 to the reverse pitch angles 52. The pitch adjustment mechanism 40 may be embodied as, or otherwise include, one or more hydraulic, electric, or pneumatic actuators. Under the control of a controller included in the engine 10, the pitch adjustment mechanism 40 may be operable to move either the first-stage fan blades 36 or the second-stage fan blades 38 as indicated above. In the illustrative embodiment, movement of one of the first and second-stage fan blades 36, 38 via the mechanism 40 causes movement of the other of the first and second-stage fan blades 36, 38.

The fan 12 further illustratively includes a torque-transmitting mechanism 42 as shown in FIG. 2. The torque-transmitting mechanism 42 is coupled between the first and second-stage fan blades 36, 38 to transmit movement of one of the first and second-stage fan blades 36, 38 to the other of the first and second-stage fan blades 36, 38. As a result, movement of one of the blades 36, 38 via the mechanism 40 causes movement of the other of the fan blades 36, 38 via the mechanism 42.

The torque-transmitting mechanism 42 is illustratively embodied as an idler gear as shown in FIG. 2. The idler gear 42 is coupled between the first-stage fan blades 36 and the second-stage fan blades 38 to transmit rotation between the blades 36, 38 as indicated above. In the illustrative embodiment, the idler gear 42 couples the blades 36, 38 to one another to cause movement of the blades 36, 38 relative to the fan disk 28 from the forward pitch angles 50 to the reverse pitch angles 52 at substantially the same time.

In other embodiments, the torque-transmitting mechanism 42 may embodied as, or otherwise include, one or more mechanisms adapted to transmit rotation between the blades 36, 38. In one example, the torque-transmitting mechanism 42 may be embodied as, or otherwise include, a toothed belt drive. In other examples, the torque-transmitting mechanism 42 may be embodied as, or otherwise include, a chain drive, a linkage, or the like.

The illustrative arrangement of the blades 30 (i.e., the stages of blades 36, 38 spaced apart along the axis 22) may enable the fan 12 to have a lower hub-to-tip ratio than a fan having one variable pitch blade stage. For the fan having one variable pitch blade stage, a single ring of circumferentially adjacent bearings carried by the one-blade-stage fan disk are used to support the one blade stage for movement relative to the one-blade-stage fan disk. Thus, the overall bearing loads associated with the fan having one variable pitch blade stage are borne by a single ring of bearings. In contrast, for the fan 12, two rings of circumferentially adjacent bearings are used to support the blades 36, 38 for movement relative to the fan disk 28. The overall bearing loads associated with the fan 12 are therefore borne by two rings of bearings, causing each ring of bearings of the fan 12 to experience a smaller load than the loads borne by the single ring of bearings of the fan having one variable pitch blade stage. To handle the larger loads, the bearings of the fan having one variable pitch blade stage may have larger diameters than the bearings of the fan 12. As a result, to minimize circumferential interference between the larger diameter bearings of the fan having one variable pitch blade stage, the diameter of the one-blade-stage fan disk may be greater than the diameter of the fan disk 28. Consequently, the fan 12 may have a lower hub-to-tip ratio than the hub-to-tip ratio of the one-blade-stage fan. The fan 12 illustratively has a hub-to-tip ratio within the range of about 0.20 to 0.28.

In operation, for a given loading level, the fan 12 may provide a higher pressure ratio than the pressure ratio provided by the one-blade-stage fan. As a result, for that loading level, the fan 12 may have an operating efficiency that is more desirable than the operating efficiency of the one-blade-stage fan.

Figure 4:
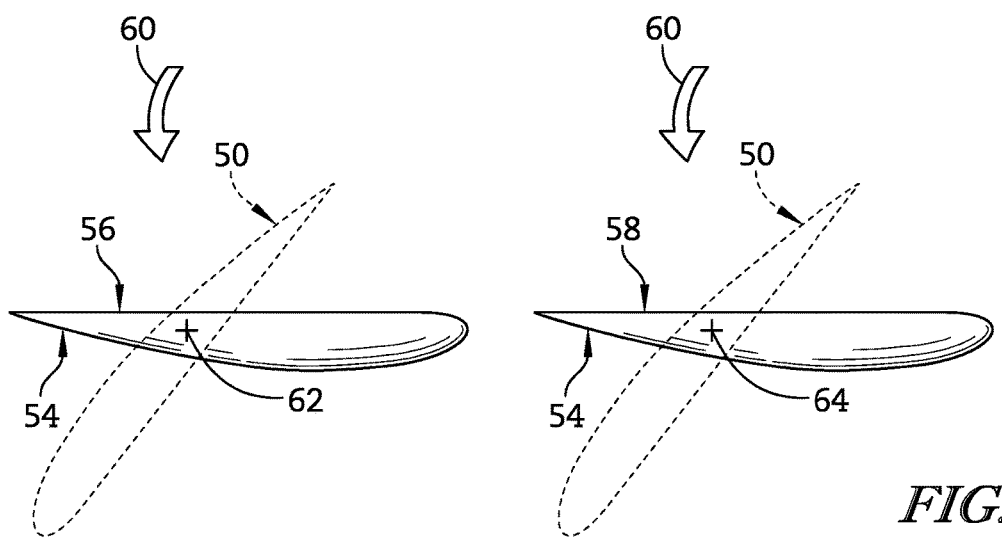

Referring now to FIGS. 3-5, in operation of the fan 12, the fan blades 30 move relative to the fan disk 28 from the forward pitch angles 50 associated with forward thrust to the reverse pitch angles 52 associated with reverse thrust. Specifically, circumferentially adjacent fan blades 56, 58 of the fan blades 30 move from the forward pitch angles 50 (shown in FIG. 3) through flat pitch angles 54 (shown in FIG. 4) associated with a lack of air being directed aftward along the axis 22 by the blades 30 to the reverse pitch angles 52 (shown in FIG. 5).

As shown in FIGS. 3-5, the fan blades 56, 58 move from the angles 50 through the angles 54 to the angles 52 in the counterclockwise direction indicated by arrow 60. The counterclockwise direction indicated by the arrow 60 may be said to be a direction of decreasing incidence. Additionally, the illustrative movement of the blades 56, 58 may be characterized as closing the blades 56, 58 to transition from the angles 50 through the angles 54 to the angles 52, or transitioning from the angles 50 to the angles 52 through fine. In the illustrative embodiment, the transition of the blades 56, 58 from the angles 50 through the angles 54 to the angles 52 in the direction indicated by arrow 60 may be associated with some degree of unsteadiness.

In other embodiments, the fan blades 56, 58 may move from the angles 50 through the angles 54 to the angles 52 in the clockwise direction. The clockwise direction may be said to be a direction of increasing incidence. Additionally, movement of the blades 56, 58 in the clockwise direction may be characterized as opening the blades 56, 58 to transition from the angles 50 through the angles 54 to the angles 52, or transitioning from the angles 50 to the angles 52 through coarse. The transition of the blades 56, 58 from the angles 50 through the angles 54 to the angles 52 in the clockwise direction may be associated with a greater degree of unsteadiness than that associated with the transition from the angles 50 through the angles 54 to the angles 52 in the counterclockwise direction indicated by arrow 60.

Referring now to FIG. 3, forward pitch angles 50 of the circumferentially adjacent fan blades 56, 58 are shown. The blades 56, 58 may be included in either of the first or second-stage fan blades 36, 38. The forward pitch angles 50 of the blades 56, 58 are shown by solid lines, whereas the reverse pitch angles 52 of the blades 56, 58 are shown by dashed lines in FIG. 3. The blades 56, 58 rotate in the counterclockwise direction indicated by arrow 60 about respective axes 62, 64 that each extend in the radial direction away from the axis 22.

As indicated above, the blades 56, 58 illustratively have a solidity of less than 1.0. The blade 56 has a chord length 56c that extends from a trailing edge 56t to a leading edge 56l of the blade 56 as shown in FIG. 3. The blade 58 has a chord length 58c that extends from a trailing edge 58t to a leading edge 58l of the blade 58 as shown in FIG. 3. The chord lengths 56c, 58c of the respective blades 56, 58 may be substantially identical to one another, or the chord lengths 56c, 58c may be different from one another. The blades 56, 58 are spaced a circumferential distance S from one another that is measured between the axes 62, 64 as shown in FIG. 3. In the illustrative embodiment, the ratio of each of the chord lengths 56c, 58c to the distance S, which is defined herein as the solidity of each of the blades 56, 58, is less than 1.0.

Referring now to FIG. 4, flat pitch angles 54 of the fan blades 56, 58 are shown. The flat pitch angles 54 of the blades 56, 58 are shown by solid lines, whereas the forward pitch angles 50 of the blades 56, 58 are shown by dashed lines in FIG. 4. The flat pitch angles 54 are associated with a lack of air being directed aftward along the axis 22 by the blades 56, 58, and therefore the flat pitch angles 54 are associated with lack of thrust (i.e., forward or reverse thrust).

Because the blades 56, 58 each have a solidity of less than 1.0, the blades 56, 58 illustratively move through the flat pitch angles 54 in the direction indicated by arrow 60 in a spaced-apart relationship with one another as shown in FIG. 4. Moreover, the solidity of the blades 56, 58 allows the blades 56, 58 to move from the forward pitch angles 50 to the reverse pitch angles 52 in a spaced-apart relationship with one another.

Referring now to FIG. 5, reverse pitch angles 52 of the fan blades 56, 58 are shown. The reverse pitch angles 52 of the blades 56, 58 are shown by solid lines, whereas the forward pitch angles 50 of the blades 56, 58 are shown by dashed lines in FIG. 5. Once the blades 56, 58 have moved to the reverse pitch angles 52, the fan 12 produces reverse thrust to brake the aircraft carrying the engine 10.

Figure 6:
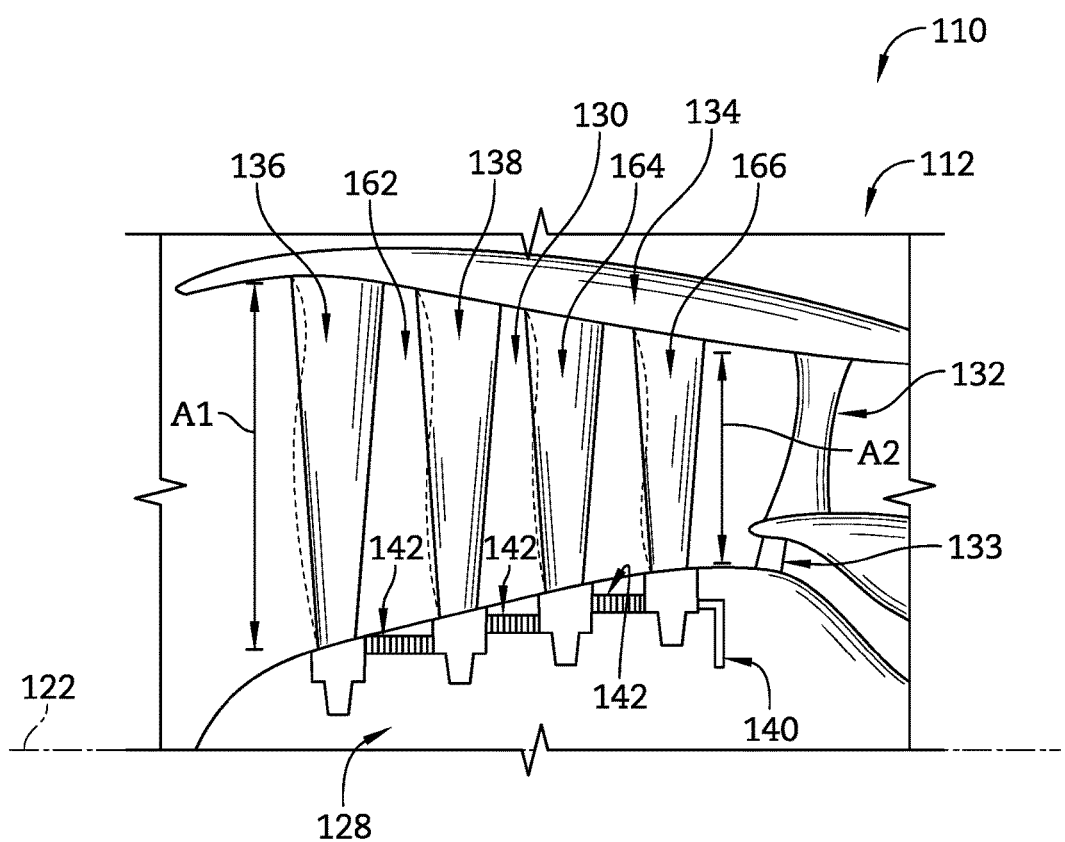
FIG. 6 is a diagrammatic view of a portion of a fan included in another embodiment of a gas turbine engine.

Referring now to FIG. 6, another fan 112 adapted for use in a gas turbine engine 110 is shown. The gas turbine 110 is substantially similar to the gas turbine engine 10 shown in FIG. 1 and described herein. The fan 112 of the engine 110 differs from the fan 12 of the engine 10, as described in more detail below.

The fan 112 illustratively includes a fan disk 128, fan blades 130, and guide vanes 132, 133 spaced axially aft of the fan blades 130 along a central axis 122 of the engine 110 as shown in FIG. 6. The fan disk 128 is adapted for rotation about the axis 122. The fan blades 130 are coupled to the fan disk 128 for common rotation with the fan disk 128 about the axis 122. The guide vanes 132, 133 are coupled to a stationary case 134 that extends around the fan blades 130 and are therefore constrained against rotation about the axis 122.

In the illustrative embodiment, the stationary case 134 extends aftward and inward toward the axis 122 in the radial direction, i.e., the direction perpendicular to the axis 122 as shown in FIG. 6. The fan disk 128 extends aftward and outward away from the axis 122 in the radial direction. The case 134 and the fan disk 128 cooperate to define a flow path 162 therebetween. The flow path 162 illustratively has an area A1 adjacent the fan blades 130 and an area A2 adjacent the outlet guide vanes 132 that is less than the area A1. As such, the flow path 162 is contracted in the axial direction, i.e., the direction parallel to the axis 122. In other embodiments, the stationary case 134 and the fan disk 128 may extend aftward in the axial direction substantially parallel to one another, like the case 34 and the fan disk 28 of the fan 12. In such embodiments, the flow path 162 may not be contracted in the axial direction.

The fan blades 130 illustratively include first-stage fan blades 136, second-stage fan blades 138, third-stage fan blades 164, and fourth-stage fan blades 166 as shown in FIG. 6. The second-stage fan blades 138 are spaced axially aft of the first-stage fan blades 136 along the axis 122. The third-stage fan blades 164 are spaced axially aft of the second-stage fan blades 138 along the axis 122. The fourth-stage fan blades 166 are spaced axially aft of the third-stage fan blades 164 along the axis 122. The fan blades 136, 138, 164, 166 are spaced from one another along the axis 122 without a stationary component positioned between the blades 136, 138, 164, 166 along the axis 122.

The first, second, third, and fourth-stage fan blades 136, 138, 164, 166 are coupled to the fan disk 128 for movement relative to the fan disk 128 from forward pitch angles through flat pitch angles to reverse pitch angles as suggested by FIG. 6. The forward pitch angles, the flat pitch angles, and the reverse pitch angles are substantially identically to the forward pitch, flat pitch, and reverse pitch angles 50, 54, 52 shown in FIGS. 3-5 and described herein. In the illustrative embodiment, each of the first, second, third, and fourth-stage fan blades 136, 138, 164, 166 have a solidity of less than 1.0.

The fan 112 further illustratively includes a pitch adjustment mechanism 140 as shown in FIG. 6. The pitch adjustment mechanism 140 is adapted to move one of the first, second, third, and fourth-stage fan blades 136, 138, 164, 166 relative to the fan disk 128 from the forward pitch angles through the flat pitch angles to the reverse pitch angles. The pitch adjustment mechanism 140 may be embodied as, or otherwise include, one or more hydraulic, electric, or pneumatic actuators. Under the control of a controller included in the engine 110, the pitch adjustment mechanism 140 may be operable to move one of the blades 136, 138, 164, 166 as indicated above. In the illustrative embodiment, movement of one of the blades 136, 138, 164, 166 via the mechanism 140 causes movement of the other of the blades 136, 138, 164, 166.

The fan 112 further includes a number of torque-transmitting mechanisms 142 as shown in FIG. 6. The torque-transmitting mechanisms 142 are coupled between the first, second, third, and fourth-stage fan blades 136, 138, 164, 166 to transmit movement of one of the blades 136, 138, 164, 166 to the other of the blades 136, 138, 164, 166. As a result, movement of one of the blades 136, 138, 164, 166 via the mechanism 140 causes movement of the other of the blades 136, 138, 164, 166 via the mechanisms 142.

The torque-transmitting mechanisms 142 are illustratively embodied as idler gears as shown in FIG. 6. The idler gears 142 are coupled between the first, second, third, and fourth-stage fan blades 136, 138, 164, 166 to transmit rotation between the blades 136, 138, 164, 166 as indicated above. In the illustrative embodiment, the idler gears 142 couple the blades 136, 138, 164, 166 to one another to cause movement of the blades 136, 138, 164, 166 relative to the fan disk 128 from the forward pitch angles through the flat pitch angles to the reverse pitch angles at substantially the same time.

In other embodiments, the torque-transmitting mechanisms 142 may be embodied as, or otherwise include, one or more mechanisms adapted to transmit rotation between the blades 136, 138, 164, 166. In one example, the torque-transmitting mechanisms 142 may include one or more toothed belt drives. In other examples, the torque-transmitting mechanisms 142 may include one or more chain drives, linkages, or the like.

The illustrative arrangement of the blades 130 (i.e., the stages of blades 136, 138, 164, 166 spaced apart along the axis 122) may enable the fan 112 to have a lower hub-to-tip ratio than a fan having one blade stage, in substantially identical fashion to the arrangement of the blades 30 of the fan 12. The fan 112 illustratively has a hub-to-tip ratio within the range of about 0.20 to 0.28.

In operation, for a given loading level, the fan 112 may provide a higher pressure ratio than the pressure ratio provided by the one-blade-stage fan. As a result, for that loading level, the fan 112 may have an operating efficiency that is more desirable than the operating efficiency of the one-blade-stage fan.

Circumferentially adjacent blades of the first, second, third, and fourth-stage fan blades 136, 138, 164,166 move from the forward pitch angles through the flat pitch angles to the reverse pitch angles in substantially identical fashion to the blades 56, 58 shown in FIGS. 3-5 and described herein. Because the blades 136, 138, 164, 166 each have a solidity of less than 1.0 as indicated above, circumferentially adjacent blades of the first, second, third, and fourth-stage fan blades 136, 138, 164, 166 move past one another through the flat pitch angles in a spaced-apart relationship with one another like the blades 56, 58 shown in FIG. 4. Additionally, the solidity of the blades 136, 138, 164, 166 allows circumferentially adjacent blades of the blades 136, 138, 164, 166 to move from the forward pitch angles to the reverse pitch angles in a spaced-apart relationship with one another like the blades 56, 58 shown in FIGS. 3-5.

Referring now to FIGS. 1-6, a method of operating an aircraft will be described. The method includes operating the fan 12, 112 of the engine 10, 110, so that the plurality of fan blades 30, 130 have forward pitch angles (e.g., forward pitch angles 50). The method further includes moving the fan blades relative to the fan disk 28, 128 from the forward pitch angles through the flat pitch angles (e.g., flat pitch angles 54) toward the reverse pitch angles (e.g., reverse pitch angles 52).

In the method described above, the plurality of fan blades include the stages of blades 36, 38 or 136, 138, 164, 166. Moving the plurality of fan blades from the forward pitch angles through the flat pitch angles toward the reverse pitch angles includes moving the stages from the forward pitch angles through the flat pitch angles toward the reverse pitch angles so that circumferentially adjacent blades of each stage are in a spaced-apart relationship with one another when the stages move through the flat pitch angles. Moving the plurality of fan blades from the forward pitch angles through the flat pitch angles toward the reverse pitch angles includes moving the stages from the forward pitch angles through the flat pitch angles toward the reverse pitch angles at substantially the same time.

The present disclosure teaches a stacked variable pitch fan that has multiple variable pitch stages adjacent to each other without a stator positioned between the stages. The solidity of the blades of each stage is less than 1.0. The number of stages with solidity less than 1.0 is determined by the pressure ratio desired.

One advantage of the stacked variable pitch fan is that the solidity of less than 1.0 for each variable pitch stage allows each stage to rotate to reverse pitch for reverse thrust by closing the fan blades. This feature provides an alternative to heavy cascade style thrust reversers or clamshell type thrust reversers. Achieving reverse thrust by closing the fan blades avoids the high forward thrust associated with achieving reverse thrust by opening the fan blades which is typically done when the blades each have solidity greater than 1.0. Achieving reverse thrust by closing the fan blades allows for a shorter runway distance than achieving reverse thrust by opening the fan blades.

Another advantage of the stacked variable pitch fan is that the stacked variable pitch fan can provide a higher pressure ratio than the single stage fan. The pressure ratio, and therefore the operating efficiency, provided by a single stage fan having overall solidity of less than 1.0 is typically less than the pressure ratio and operating efficiency that is provided by a single stage fan having overall solidity of greater than or equal to 1.0. However, because the effective (i.e., the combined) solidity of the stacked variable pitch fan is greater than that of a single stage fan having an overall solidity of less than 1.0, the stacked variable pitch can provide a higher pressure ratio, and therefore a more desirable operating efficiency, than the pressure ratio and operating efficiency provided by the single stage fan having an overall solidity of less than 1.0.

Yet another advantage of the stacked variable pitch fan is that the multiple stages of the stacked fan allow the hub-to-tip ratio of the fan to be reduced. Specifically, the multiple blade stages allow for more circumferential distance between the bearings that hold the spindles of the blades of each of the stages.

There are several ways the stacked variable pitch fan could be implemented depending on the cycle requirements of the fan. For very low pressure ratio fans, a two-stage fan with no contraction in the flowpath could be used. However, with contraction in the flowpath, a higher pressure ratio could be generated. For higher pressure ratio fans, three or four stages of blades with an optionally contracting fan annulus could be used to generate the pressure ratio while still allowing for each stage to have solidity of less than 1.0.

For both the two-stage and four-stage variable pitch fans, a variable pitch actuator may be used to control only one of the stages. An idler gear may be positioned between the stages of the two-stage and four-stage variable pitch fan so that the other stage(s) of the two and four-stage fans are controlled in response to the control of the only one stage.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A fan for a gas turbine engine, the fan comprising
a fan disk adapted for rotation about a central axis, and
a plurality of fan blades coupled to the fan disk for rotation therewith about the central axis, the plurality of fan blades including first-stage fan blades and second-stage fan blades spaced axially aft of the first-stage fan blades along the central axis,
wherein the first-stage and second-stage fan blades are coupled to the fan disk for movement relative to the fan disk from forward pitch angles associated with air directed aftward along the central axis to reverse pitch angles associated with air directed forward along the central axis, and each of the first-stage and second-stage fan blades have a solidity of less than 1.0, wherein the first-stage and second-stage fan blades are coupled together for movement relative to the fan disk from the forward pitch angles to the reverse pitch angles at substantially the same time.

2. The fan of claim 1, further comprising an idler gear coupled between the first-stage and second-stage fan blades, the idler gear coupling the first-stage and second-stage fan blades to cause movement of the first-stage and second-stage fan blades relative to the fan disk at substantially the same time.

3. The fan of claim 1, wherein the first-stage and second-stage fan blades are coupled to the fan disk for movement relative to the fan disk from the forward pitch angles to the reverse pitch angles in a counterclockwise direction.

4. The fan of claim 3, wherein the fan has a hub-to-tip ratio within the range of 0.20 to 0.28.

5. The fan of claim 1, wherein circumferentially adjacent blades of the first-stage fan blades are movable past one another in a spaced-apart relationship with one another when the first-stage fan blades are moved relative to the fan disk from the forward pitch angles to the reverse pitch angles, and circumferentially adjacent blades of the second-stage fan blades are movable past one another in a spaced-apart relationship with one another when the second-stage fan blades are moved relative to the fan disk from the forward pitch angles to the reverse pitch angles.

6. The fan of claim 5, wherein the plurality of fan blades includes (i) third-stage fan blades spaced axially aft of the second-stage fan blades along the central axis and (ii) fourth-stage fan blades spaced axially aft of the third-stage fan blades along the central axis, the third-stage and fourth-stage fan blades are coupled to the fan disk for movement relative to the fan disk from forward pitch angles associated with air directed aftward along the central axis to reverse pitch angles associated with air directed forward along the central axis, circumferentially adjacent blades of the third-stage fan blades are movable past one another in a spaced-apart relationship with one another when the third-stage fan blades are moved relative to the fan disk from the forward pitch angles to the reverse pitch angles, and circumferentially adjacent blades of the fourth-stage fan blades are movable past one another in a spaced-apart relationship with one another when the fourth-stage fan blades are moved relative to the fan disk from the forward pitch angles to the reverse pitch angles.

7. A fan for a gas turbine engine, the fan comprising
a fan disk adapted for rotation about a central axis, and
a plurality of fan blades coupled to the fan disk for rotation therewith about the central axis, the plurality of fan blades including first-stage fan blades and second-stage fan blades spaced axially aft of the first-stage fan blades along the central axis,
wherein the first-stage and second-stage fan blades are coupled to the fan disk for movement relative to the fan disk from forward pitch angles associated with air directed aftward along the central axis to reverse pitch angles associated with air directed forward along the central axis, and each of the first-stage and second-stage fan blades have a solidity of less than 1.0
wherein the plurality of fan blades includes (i) third-stage fan blades spaced axially aft of the second-stage fan blades along the central axis and (ii) fourth-stage fan blades spaced axially aft of the third-stage fan blades along the central axis, the third-stage and fourth-stage fan blades are coupled to the fan disk for movement relative to the fan disk from forward pitch angles associated with air directed aftward along the central axis to reverse pitch angles associated with air directed forward along the central axis, and each of the third-stage and fourth-stage fan blades have a solidity of less than 1.0.

8. The fan of claim 7, wherein the third-stage and fourth-stage fan blades are coupled together for movement relative to the fan disk from the forward pitch angles to the reverse pitch angles at substantially the same time.

9. The fan of claim 8, further comprising an idler gear coupled between the third-stage and fourth-stage fan blades, the idler gear coupling the third-stage and fourth-stage fan blades to cause movement of the third-stage and fourth-stage fan blades relative to the fan disk at substantially the same time.

10. The fan of claim 7, wherein the first-stage, second-stage, third-stage, and fourth-stage fan blades are coupled to the fan disk for movement relative to the fan disk from the forward pitch angles to the reverse pitch angles in a counterclockwise direction.

11. The fan of claim 10, wherein the fan has a hub-to-tip ratio within the range of 0.20 to 0.28.

12. A fan for a gas turbine engine, the fan comprising
a fan disk adapted for rotation about a central axis, and
a plurality of fan blades coupled to the fan disk for rotation therewith about the central axis, the plurality of fan blades including first-stage fan blades and second-stage fan blades spaced axially aft of the first-stage fan blades along the central axis,
wherein the first-stage and second-stage fan blades are coupled to the fan disk for movement relative to the fan disk from forward pitch angles associated with air directed aftward along the central axis through flat pitch angles associated with a lack of air being directed aftward along the central axis to reverse pitch angles associated with air directed forward along the central axis,
further comprising an idler gear coupled between the first-stage and second-stage fan blades, the idler gear coupling the first-stage and second-stage fan blades to cause movement of the first-stage and second-stage fan blades relative to the fan disk from the forward pitch angles through the flat pitch angles to the reverse pitch angles at substantially the same time.

13. The fan of claim 12, wherein circumferentially adjacent blades of the first-stage fan blades are in a spaced-apart relationship with one another when the first-stage fan blades move through the flat pitch angles and circumferentially adjacent blades of the second-stage fan blades are in a spaced-apart relationship with one another when the second-stage fan blades move through the flat pitch angles.

14. The fan of claim 12, wherein the plurality of fan blades include (i) third-stage fan blades spaced axially aft of the second-stage fan blades along the central axis and (ii) fourth-stage fan blades spaced axially aft of the third-stage fan blades along the central axis, the third and fourth-stage fan blades are coupled to the fan disk for movement relative to the fan disk from forward pitch angles associated with air directed aftward along the central axis through flat pitch angles associated with a lack of air being directed aftward along the central axis to reverse pitch angles associated with air directed forward along the central axis, circumferentially adjacent blades of the third-stage fan blades are in a spaced-apart relationship with one another when the third-stage fan blades move through the flat pitch angles, and circumferentially adjacent blades of the fourth-stage fan blades are in a spaced-apart relationship with one another when the fourth-stage fan blades move through the flat pitch angles.

15. A method of operating an aircraft, the method comprising
  operating a fan included in a gas turbine engine of the aircraft so that a plurality of fan blades of the fan have forward pitch angles associated with air directed aftward along a central axis of the gas turbine engine, and
  moving the plurality of fan blades relative to a fan disk of the fan from the forward pitch angles through flat pitch angles associated with a lack of air being directed aftward along the central axis toward reverse pitch angles associated with air directed forward along the central axis,
  wherein the plurality of fan blades have a solidity of less than 1.0,
  wherein the plurality of fan blades comprises at least two stages of fan blades axially spaced from one another along the central axis, and moving the plurality of fan blades from the forward pitch angles through the flat pitch angles toward the reverse pitch angles comprises moving the at least two stages of fan blades from the forward pitch angles through the flat pitch angles toward the reverse pitch angles so that circumferentially adjacent blades of each stage of the at least two stages of fan blades are in a spaced-apart relationship with one another when the at least two stages of fan blades move through the flat pitch angles,
  wherein moving the plurality of fan blades from the forward pitch angles through the flat pitch angles toward the reverse pitch angles comprises moving the at least two stages of fan blades from the forward pitch angles through the flat pitch angles toward the reverse pitch angles at substantially the same time.

* * * * *